No. 664,477. Patented Dec. 25, 1900.
J. C. HOLTZCLAW.
FERTILIZER DISTRIBUTER.
(Application filed Sept. 13, 1900.)
(No Model.)
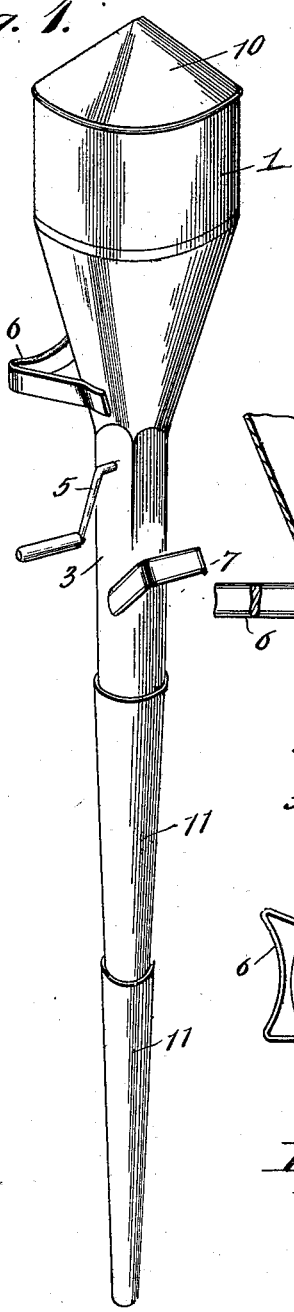
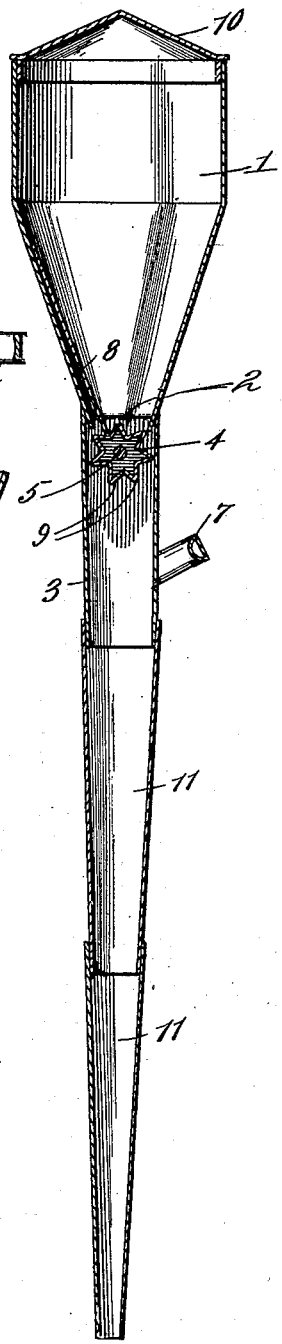
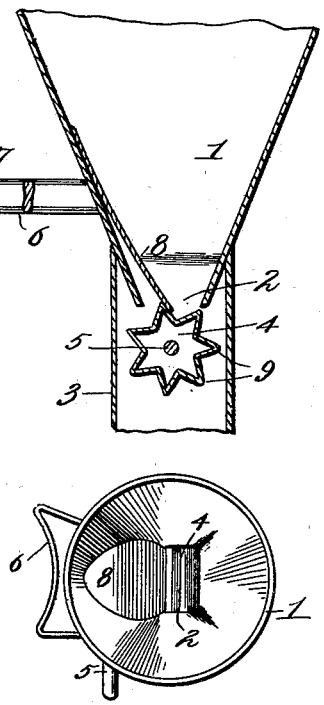
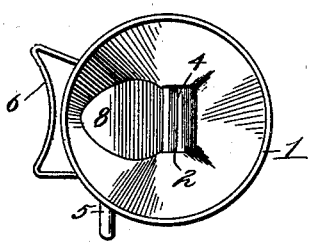
Witnesses
C. H. Walker
J. W. Garner
J. C. Holtzclaw, Inventor.
By C. A. Snow & Co.
Attorneys
THE NORRIS PETERS CO., PHOTO-LITHO., WASHINGTON, D. C.

UNITED STATES PATENT OFFICE.

JAMES C. HOLTZCLAW, OF PALMETTO, FLORIDA.

FERTILIZER-DISTRIBUTER.

SPECIFICATION forming part of Letters Patent No. 664,477, dated December 25, 1900.

Application filed September 13, 1900. Serial No. 29,939. (No model.)

*To all whom it may concern:*

Be it known that I, JAMES C. HOLTZCLAW, a citizen of the United States, residing at Palmetto, in the county of Manatee and State of Florida, have invented a new and useful Fertilizer-Distributer, of which the following is a specification.

My invention is an improved manually-operated fertilizer-distributer which is adapted for placing fertilizer in the furrows in any desired quantity in each hill, which is exceedingly cheap and portable, and which may be lengthened or shortened, as may be required.

My invention consists in the peculiar construction and combination of devices hereinafter fully set forth, and pointed out in the claims.

In the accompanying drawings, Figure 1 is a perspective view of a fertilizer-distributer embodying my improvements. Fig. 2 is a vertical sectional view of the same. Fig. 3 is a detail sectional view on a larger scale. Fig. 4 is a top plan view looking in the hopper, the cover thereof being removed.

In the embodiment of my invention I provide a hopper 1, of suitable size and shape, which has a contracted discharge-opening 2, which communicates with a spout 3. The latter is rectangular in cross-section, and in the said spout, immediately below the contracted discharge-opening of the hopper, is a feed-wheel 4, which is rotated by a crank-shaft 5, which is adapted to be turned by one hand of the operator, said crank-shaft having its bearings in opposite sides of the spout 3. On one side of the hopper, near the lower side thereof, is a rest 6, adapted to fit against the body of the operator, and on the spout 3, on the side opposite the rest 6, is a handle 7, which is adapted to be grasped by the left hand of the operator. A spring-plate 8 is placed in the hopper, in one side thereof, secured at its upper end thereto, the lower end of the said spring-plate extending downward through one side of the contracted discharge-opening of the hopper and coacting with the feed-wheel. The latter is provided with a series of peripheral corrugations or valves 9, each of which is of suitable capacity. The said valves or corrugations form cups, which are adapted, as they are successively disposed on the upper side of the feed-wheel and presented under the contracted discharge-opening 2 by the rotation of the feed-wheel, to become filled with fertilizer discharged thereto from the hopper in which the fertilizer is placed. The spring-plate engages each cup or valve of the feed-wheel in succession and tends to resist rotation of the feed-wheel, the rotation of the latter being against the tension of said spring, and hence a step-by-step movement is imparted to the feed-wheel when the same is turned, and the feed-wheel may be turned to any required extent in order to deposit the contents of one or more of the cups or valves thereof in a hill, accordingly as more or less fertilizer is required therein. The spring-plate also by the vibratory motion which is imparted thereto by the feed-wheel serves to stir and agitate the fertilizer in the hopper and insure the feeding thereof to the feed-wheel. A suitable cover 10 is provided for the hopper.

The spout 3 may be extended in length by a series of tubular sections 10, each of which tapers toward one end and which are secured together and to the spout 3, as shown, and may be readily separated. By this means the discharge-spout of the fertilizer-distributer may be of any length required to suit the operator, and the latter is not required to stoop when using the fertilizer-distributer, and hence the same may be used without excessive fatigue.

Another advantage resulting from the use of my improved fertilizer-distributer is that the fertilizer is applied directly to the hills and cannot be wasted or scattered by the wind.

Having thus described my invention, I claim—

1. A fertilizer-distributer comprising a hopper having a contracted discharge-opening at its lower end and a depending spout, a revoluble feed-wheel in said spout, immediately below and cutting off said discharge-opening, said feed-wheel having peripheral cups or valves, and a spring-plate in one side of the hopper and having its free end bearing on said feed-wheel and successively engaging the cups or valves thereof, said spring-plate retarding the rotation of said feed-wheel, substantially as described.

2. A fertilizer-distributer comprising a hopper having a contracted discharge-opening at its lower end and a depending spout, a revoluble feed-wheel in said spout, immediately below and cutting off said discharge-opening, said feed-wheel having peripheral cups or valves, a spring-plate in one side of the hopper and having its free end bearing on said feed-wheel and successively engaging the cups or valves thereof, said spring-plate retarding the rotation of said feed-wheel, a rest on one side of the hopper to bear against the body of the operator, a handle on the discharge-spout, on the side opposite said rest, and a crank to rotate said feed-wheel, substantially as described.

In testimony that I claim the foregoing as my own I have hereto affixed my signature in the presence of two witnesses.

JAMES C. HOLTZCLAW.

Witnesses:
JNO. W. JACKSON,
J. J. HALEY.